US009495350B2

(12) United States Patent
John et al.

(10) Patent No.: US 9,495,350 B2
(45) Date of Patent: Nov. 15, 2016

(54) SYSTEM AND METHOD FOR DETERMINING EXPERTISE THROUGH SPEECH ANALYTICS

(75) Inventors: Ajita John, Holmdel, NJ (US); Michael J. Sammon, Watchung, NJ (US); Reinhard Klemm, Basking Ridge, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 466 days.

(21) Appl. No.: 13/617,553

(22) Filed: Sep. 14, 2012

(65) Prior Publication Data
US 2014/0081643 A1   Mar. 20, 2014

(51) Int. Cl.
| | |
|---|---|
| *G06F 17/27* | (2006.01) |
| *G10L 17/00* | (2013.01) |
| *G10L 15/26* | (2006.01) |
| *G10L 15/08* | (2006.01) |

(52) U.S. Cl.
CPC .............. *G06F 17/27* (2013.01); *G10L 15/08* (2013.01); *G10L 15/265* (2013.01); *G10L 17/00* (2013.01); *G10L 2015/088* (2013.01)

(58) Field of Classification Search
CPC .. G10L 15/08; G10L 17/00; G10L 2015/088
See application file for complete search history.

(56) References Cited

U.S. PATENT DOCUMENTS

| 8,127,236 | B2* | 2/2012 | Hamilton et al. ............ 715/757 |
| 8,266,127 | B2* | 9/2012 | Mattox et al. ................ 707/705 |
| 8,892,549 | B1* | 11/2014 | Thakur .......................... 707/728 |
| 2003/0144895 | A1* | 7/2003 | Aksu et al. ........................ 705/9 |
| 2004/0165705 | A1* | 8/2004 | Cragun ...................... 379/88.17 |
| 2006/0149781 | A1 | 7/2006 | Blankinship |
| 2007/0162432 | A1* | 7/2007 | Armstrong et al. .............. 707/3 |
| 2008/0140421 | A1* | 6/2008 | Marturano et al. ........... 704/275 |
| 2008/0215541 | A1* | 9/2008 | Li et al. ............................ 707/3 |
| 2008/0235018 | A1* | 9/2008 | Eggen et al. .................. 704/251 |
| 2009/0019021 | A1* | 1/2009 | Davies .............................. 707/4 |
| 2009/0157726 | A1* | 6/2009 | Abernethy et al. ........... 707/102 |
| 2009/0171985 | A1 | 7/2009 | Tischer |
| 2011/0078155 | A1* | 3/2011 | Seligmann et al. .......... 707/748 |
| 2011/0112835 | A1* | 5/2011 | Shinnishi et al. ............ 704/235 |
| 2011/0153588 | A1* | 6/2011 | Gartner et al. ............... 707/709 |
| 2011/0313987 | A1* | 12/2011 | Ghosh et al. ................. 707/706 |

(Continued)

FOREIGN PATENT DOCUMENTS

| EP | 2320333 | 5/2011 |
| WO | WO 2005071665 | 8/2005 |

*Primary Examiner* — Samuel G Neway
(74) *Attorney, Agent, or Firm* — Sheridan Ross P.C.

(57) ABSTRACT

Systems, methods, and non-transitory computer-readable storage media for determining expertise through speech analytics. The system associates speakers with respective segments of an audio conversation to yield associated speaker segments. The system also identifies a number of times a speaker has spoken about a topic in the audio conversation by searching the associated speaker segments for a term associated with the topic. The system then ranks the speaker as an expert in the topic when the number of times the speaker has spoken about the topic in the audio conversation exceeds a threshold. The audio conversation can include a compilation of a plurality of audio conversations. Moreover, the system can tag the associated speaker segments having the term with keyword tags and match a respective segment from the associated speaker segments with the speaker, the respective segment having a keyword tag.

18 Claims, 5 Drawing Sheets

(56) References Cited

U.S. PATENT DOCUMENTS

2012/0229446 A1* 9/2012 Hyndman et al. ............ 345/419
2013/0007121 A1* 1/2013 Fontenot et al. ............. 709/204
2013/0018967 A1* 1/2013 Gannu et al. ................. 709/206
2014/0081643 A1* 3/2014 John et al. .................... 704/270

* cited by examiner

SYSTEM AND METHOD FOR DETERMINING EXPERTISE THROUGH SPEECH ANALYTICS

BACKGROUND

1. Technical Field

The present disclosure relates to determining experts and more specifically to determining expertise through speech analytics.

2. Introduction

Enterprises often analyze the skills of their employees to make expertise determinations. Employees can then be classified as experts in their respective areas of interest and expertise. This allows an enterprise to quickly identify which employees may be an effective resource in a specific area. As a result, the enterprise can direct questions, comments, problems, and relevant information to designated experts in an efficient manner.

Unfortunately, making expertise determinations in an enterprise can be a difficult and costly undertaking, particularly in larger enterprises which have a vast number of employees. Typically, the skills of employees, including agents in contact centers, are statically determined through a skills database. However, the skills database is often incomplete or outdated, which drastically reduces the accuracy and comprehensiveness of the expertise determinations. Accordingly, it is generally very difficult to quickly and accurately identify which employees may be an effective resource in a specific area.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can dynamically obtain expertise information to accurately and efficiently make expertise determinations. The expertise determinations allow users and enterprises to direct questions, comments, problems, and relevant information to accurately designated experts in an efficient manner. These approaches can analyze the content of conversations to infer expertise information and rank experts in their respective areas. The content of conversations can provide vast amounts of useful expertise information, as employees routinely participate in audio meetings and trainings to discuss topics in their area of interest and expertise. The expertise information extracted from conversations can help maintain the expertise determinations current, as the expertise information can be based on recent conversations and, therefore, the expertise information itself can be current.

Disclosed are systems, methods, and non-transitory computer-readable storage media for determining expertise through speech analytics. The system associates speakers with respective segments of an audio conversation to yield associated speaker segments. The associated speaker segments can identify the speaker in the various segments of the audio conversation. The system can associate speakers with respective segments of an audio conversation by tagging the respective segments with a tag representing the respective speaker in the segment.

The system also identifies a number of times a speaker has spoken about a topic in the audio conversation by searching the associated speaker segments for a term associated with the topic. The system can identify the number of times the speaker has spoken about the topic within a period of time. Further, the system can identify the number of times the speaker has spoken about the topic based on a probability that a respective segment from the associated speaker segments contains the term. The probability can be based on a threshold, which can be modified based on a desired result, a context, a topic, a keyword, a schedule, a complexity, an age, a history, an accuracy, a previous result, etc.

The system can tag the associated speaker segments having the term with a tag representing the term. In one embodiment, the system tags one or more segments from the associated speaker segments with a keyword tag based on a probability that the one or more segments contain the keyword. For example, segments can be tagged with the keyword based on a probability that the keyword is mentioned by the speaker in the segment. The system can also match respective segments having the term with the speaker in the respective segments. The system can match segments having the term with respective speakers in the segments based on speaker tags associated with the segments and/or keyword tags associated with the segments having the term.

The audio conversation can include a compilation of a plurality of audio conversations, and each of the plurality of audio conversations can include one or more speakers. For example, the plurality of audio conversations can include a lecture by a single speaker and a conversation between three different speakers. Further, the term can be retrieved from a file, a database, a tag, a profile, a document, a list, a message, metadata, etc. Moreover, the term can be provided as input by a user requesting an expert, for example. The term can indicate a skill, a subject, an item, a topic, a specialty, an expertise, an interest, knowledge, and so forth. The term can be combined with other terms to yield a cluster of terms. The terms in the cluster of terms can be weighed and/or scored based on a probability that the terms indicate an expertise and/or an estimation of the terms' relevance and/or indicative strength.

Next, the system ranks the speaker as an expert in the topic when the number of times the speaker has spoken about the topic in the audio conversation exceeds a threshold. The speaker can be ranked as an expert based on a level of expertise. The level of expertise can be based on, for example, a score, a confidence, a degree of knowledge, a history of communications, a profile, a tag, experience, and so forth. The speaker can be ranked as an expert based on how many times the speaker has spoken about the topic, how long ago the speaker has spoken about the topic, the manner in which the speaker has spoken about the topic, the effectiveness of the speaker's communication about the topic, the content of the speaker's communication about the topic, the length of the speaker's communication about the topic, information obtained through a discourse analysis, and so forth. In one embodiment, the speaker is ranked as an expert based on an expertise vector. The expertise vector can be based on several factors such as, for example, an expertise, a prior communication effectiveness, a language, a prior communication manner, a prior communication length, an amount of prior communications related to the topic, a prior communication content, a context, a speaker's identity, a speaker's profile, a speaker's age, a speaker's experience, a tag, an interest, a rating, a degree of knowledge, a confidence in prior communications about the topic, etc.

Further, the expertise rank can be used to infer an expertise in a different topic. For example, an expertise rank in one aspect of a language can be used to infer an expertise in the language in general. Clusters of expertise ranks can be developed to create relationships between different expertise areas. The clusters of expertise ranks can then be used to make expertise inferences in different topics and/or areas.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for accurately and efficiently determining expertise. A system, method and non-transitory computer-readable media are disclosed which determine expertise through speech analytics. A brief introductory description of a basic general purpose system or computing device in FIG. 1, which can be employed to practice the concepts, is disclosed herein, followed by a discussion of a natural spoken language dialog system. A more detailed description of determining expertise through speech analytics will then follow. These variations shall be discussed herein as the various embodiments are set forth. The disclosure now turns to FIG. 1.

Figure 1:
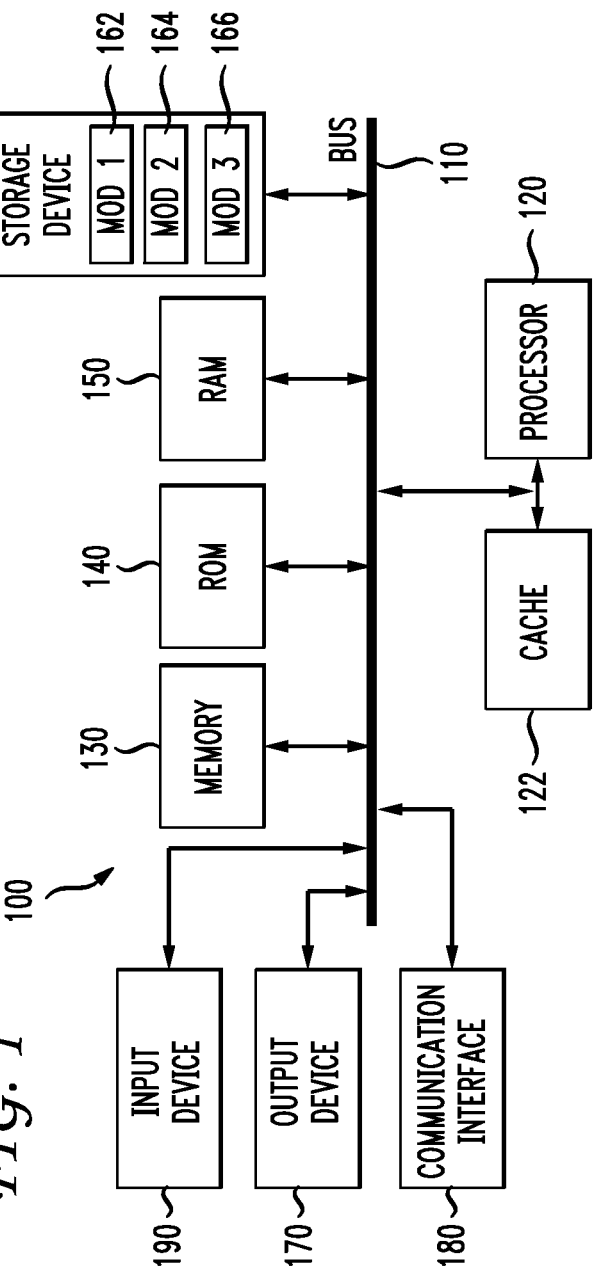
FIG. 1 illustrates an example system embodiment.

With reference to FIG. 1, an exemplary system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache of high speed memory connected directly with, in close proximity to, or integrated as part of the processor 120. The computing device 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the computing device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100.

The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
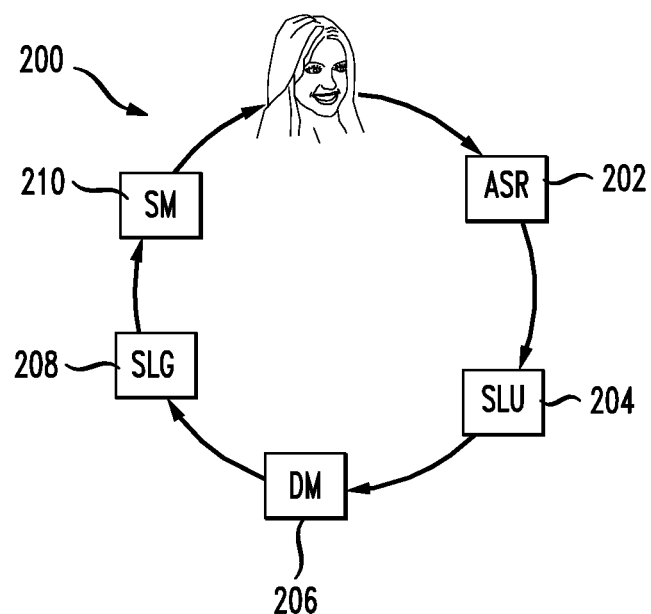
FIG. 2 illustrates a functional block diagram of an exemplary natural language spoken dialog system.

Having disclosed some components of a computing system, the disclosure now turns to FIG. 2, which illustrates a functional block diagram of an exemplary natural language spoken dialog system. Spoken dialog systems aim to identify intents of humans, expressed in natural language, and take actions accordingly to satisfy the human requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module can represent any type of artificial speech output. The present disclosure can be incorporated as part of the ASR module 202 and can be included as part of other components of the dialog system as well.

The ASR module 202 analyzes speech input and provides a textual transcription of the speech input as output. The ASR module 202 can also analyze speech and provide a tag and/or an index of the speech as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, tag the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." As another example, a computing device can include an ASR module that searches an audio speech file, identifies a keyword and/or phrase in the speech and generates a tag and/or index of the keyword and/or phrase. A module for performing speaker verification can join the system at any point or at multiple points in the cycle or can be integrated with any of the modules shown in FIG. 2.

Figure 3:
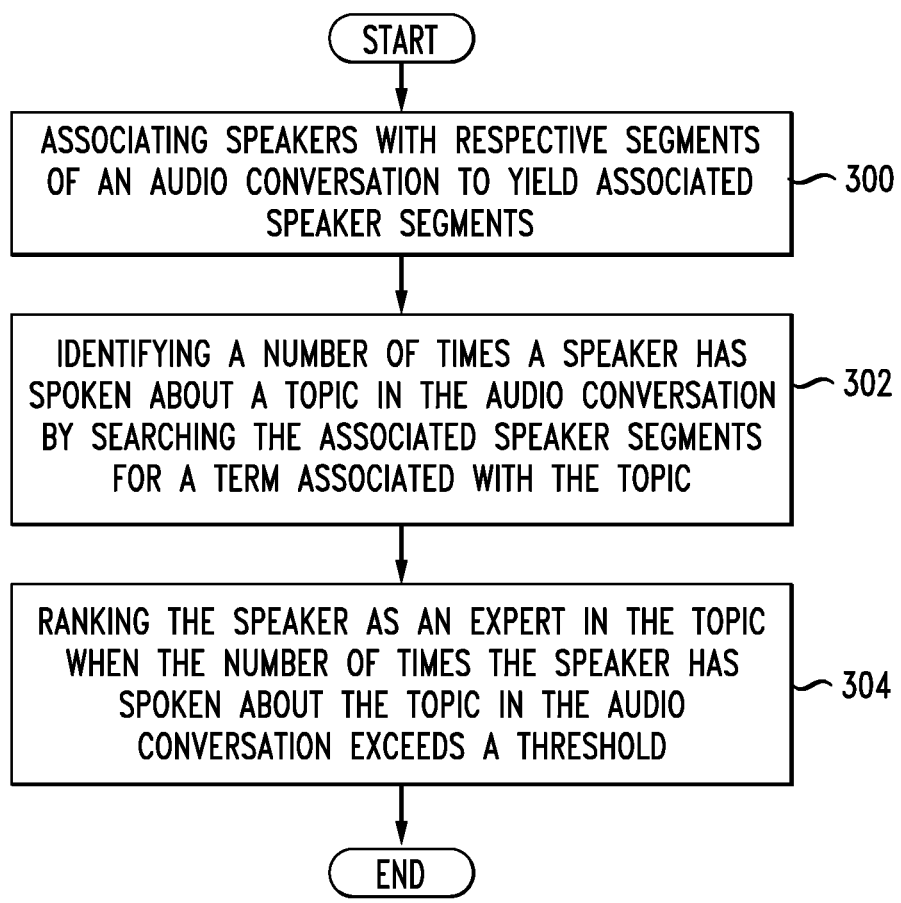
FIG. 3 illustrates an exemplary method embodiment.

Having disclosed some components of a computing system and a natural language spoken dialog system, the disclosure now turns to the exemplary method embodiment shown in FIG. 3. For the sake of clarity, the method is discussed in terms of an exemplary computing device 100, as shown in FIG. 1, configured to practice the method. The steps outlined herein are exemplary and can be implemented in any combination thereof, including combinations that exclude, add, or modify one or more steps.

The computing device 100 associates speakers with respective segments of an audio conversation to yield associated speaker segments (300). The associated speaker segments can identify the speaker in the various segments of the audio conversation. The computing device 100 can associate speakers with respective segments of an audio conversation by tagging the respective segments with a tag representing the respective speaker in the segment. The computing device 100 can segment the audio conversation by speakers to yield speaker segments, and the speaker segments can be tagged with speaker identity tags. For example, the computing device 100 can capture speakerturns in the audio conversation and store them as tags which index audio conversations. Here, the audio conversation can be split into segments indexed by speakerturns. The computing device 100 can also segment multiple audio conversations by speakers and index the segments by speakerturns. The computing device 100 can store the speaker segments and/or the speaker identity tags or transmit them to a remote device for storage and/or analysis.

The speaker identity tags can identify the respective speakers in the segments. In this way, the speaker identity tags can identify who spoke when during a conversation. The computing device 100 can obtain the identity of the speakers from login information, such as userids, provided by the speakers. For example, the computing device 100 can obtain the identity of the speakers by matching login information provided by a user with user information in an Lightweight Directory Access Protocol (LDAP) directory. The computing device 100 can also obtain the identity of the speakers based on an endpoint, a profile, an input, user tags, etc. For example, the computing device 100 can obtain the identity of a speaker by prompting the speaker to provide an identity.

The computing device 100 also identifies a number of times a speaker has spoken about a topic in the audio conversation by searching the associated speaker segments for a term associated with the topic (302). The computing device 100 can also identify the number of times the speaker has spoken about the topic in other sources, such as a text, a tag, a video, a blog, and so forth. The computing device 100 can identify the number of times the speaker has spoken about the topic within a period of time. Further, the computing device 100 can identify the number of times the speaker has spoken about the topic based on a probability that a respective segment from the associated speaker segments contains the term. The probability can be based on a threshold, which can be modified based on a desired result, a context, a topic, a keyword, a schedule, a complexity, an age, a history, an accuracy, a previous result, etc.

Further, the computing device 100 can identify the number of times the speaker has spoken about the topic in the audio conversation by searching the associated speaker segments for a set of terms associated with the topic. The terms in the set of terms can be scored according to a probability that the terms indicate an expertise in the topic. Moreover, the scores associated with the terms can be combined to yield a combined score, which can be used to determine an expertise in the topic. For example, the combined score associated with the set of terms can indicate an expertise in the topic when a scoring threshold is reached. The set of terms can indicate an expertise in one or more topics when the combined score reaches a respective scoring threshold associated with the one or more topics. Clusters of terms can relate to an expertise in an area even though specific terms can, in different contexts, signify an expertise in different areas. Accordingly, the clusters of terms can be used to obtain a score and/or probability that the speaker is an expert in the topic.

Moreover, a cluster of terms having a specific weight and/or score can indicate expertise in one area, while the cluster of terms having a different weight and/or score can indicate an expertise in a different area. Also, a cluster of terms combined with another cluster of terms can indicate an expertise in a particular area. For example, a cluster of terms can indicate an expertise in java as it relates to the marketplace and, on the other hand, when combined with other terms, the cluster of terms can indicate an expertise in java as it relates to specific software development practices. To this end, the computing device 100 can combine a cluster of terms with another term (or cluster of terms) to determine an expertise in an area.

The computing device 100 can tag the associated speaker segments having the term with a tag representing the keyword. In one embodiment, the computing device 100 tags one or more segments from the associated speaker segments with a keyword tag based on a probability that the one or more segments contain the term. For example, segments can be tagged with the term based on a probability that the term is mentioned by the speaker in the segment. As another example, the computing device 100 can tag segments with the term based on a probability that the term matches an utterance in the audio conversation. The computing device 100 can obtain a probability of a keyword phrase matching an audio segment. The segments can be matched with the term when a probability threshold that the term is in the segment is reached. A threshold for a match can be set to a level depending on the desired accuracy, for example. Also, the probability threshold can be set and/or modified based on a desired result, a context, a topic, a keyword, a schedule, a complexity, an age, a history, a previous result, etc.

The computing device 100 can match respective segments having the term with the speaker in the respective segments. The computing device 100 can match segments having the term with respective speakers in the segments based on speaker tags associated with the segments and/or keyword tags associated with the segments having the term. In one embodiment, the computing device 100 mines the audio conversation for keywords from a skills database and tags segments having the keyword with a tag representing the keyword. The computing device 100 can then determine when a speaker has spoken about a topic associated with the keyword based on the segments associated with the speaker that contain a keyword tag. For example, a segment can be tagged with the speaker identity tag "Joe" and the keyword tag "social media," indicating that Joe spoke in the segment about social media. Moreover, a segment can be tagged with more than one keyword tag. For example, a segment can be tagged with the speaker identity tag "Joe" and the keyword tags "collaborative applications" and "social media," indicating that Joe spoke in the segment about collaborative applications and social media.

The audio conversation can include a compilation of a plurality of audio conversations, and each of the plurality of audio conversations can include one or more speakers. For example, the plurality of audio conversations can include a lecture by a single speaker and a conversation between three different speakers. The term can be retrieved from a file, a database, a tag, a profile, a document, a list, a message, metadata, etc. Moreover, the term can be provided as input by a user requesting an expert, for example. The term can indicate a skill, a subject, an item, a topic, a specialty, an expertise, an interest, knowledge, and so forth. For example, the term can be "pbx," which indicates knowledge of private branch exchanges. Moreover, the term can include multiple words. For example, the term can be a skill phrase, such as "java programming," "voice over IP," "enterprise telephony," "collaborative applications," etc.

Next, the computing device 100 ranks the speaker as an expert in the topic when the number of times the speaker has spoken about the topic in the audio conversation exceeds a threshold (304). For example, the computing device 100 can rank a speaker on a topic or skill associated with the term based on the number of matches with segments tagged with that speaker and term. The computing device 100 can rank multiple speakers as experts in their respective skills based on the number of matches with segments tagged with the respective speakers and the respective terms. This can be based on multiple audio conversations as well. For example, the computing device 100 can segment multiple audio conversations by speakers, identify the number of times one or more speakers have mentioned a keyword in the audio conversations, and rank the one or more speakers based on the number of matches with segments tagged with the one or more speakers and the term.

The speaker can be ranked as an expert based on a level of expertise. The level of expertise can be based on, for example, a score, a confidence, a degree of knowledge, a history of communications, a profile, a tag, a rating, experience, an age of the speaker, and so forth. The speaker can be classified based on many categories, such as, for example, expert, specialized expert, broad expert, experienced expert, new expert, senior expert, student expert, novice, etc. Also, the speaker can be ranked as an expert based on how many times the speaker has spoken about the topic, how long ago the speaker has spoken about the topic, the manner the speaker has spoken about the topic, the effectiveness of the speaker's communication about the topic, the content of the speaker's communication about the topic, the length of the speaker's communication about the topic, and so forth. For example, the speaker can be ranked as an expert based on the number of segments tagged with the speaker and term; the length of the segment; the level of probabilistic match between the speaker, the segment, and the term; and/or the recency of the data.

In one embodiment, the ranking is higher when the speaker discusses a topic for a longer period. In another embodiment, the ranking is higher when the data is based on newer conversation, as older conversations are assumed to contribute less to the ranking. In yet another embodiment, the way a speaker speaks about a topic can affect the ranking. For example, a speaker who states "as an expert in cars," could be ranked higher than a speaker who states "I just started learning about cars." Moreover, the effectiveness of the communication can affect the ranking. For example, the ranking can be higher when a user responds "Great answer" to an answer from the speaker, than if the user responds "I don't understand" to the answer from the speaker.

Further, the computing device 100 can perform a discourse analysis of the audio conversation to determine an expertise of the speaker. The discourse analysis can include a search of the audio conversation for terms and/or phrases that indicate a behavior that is relevant to an expertise determination of the speaker. For example, the computing device 100 can perform a discourse analysis of the audio conversation to determine the speaker's "authority" on the topic, and determine an expertise of the speaker based on the speaker's expertise and "authority" on the topic. As another example, the computing device 100 can perform a discourse analysis of the audio conversation to determine if a second party has asked questions on the topic, to determine if the speaker is a good communicator. The computing device 100 can then use the speaker's communication abilities as determined from the discourse analysis when determining an expertise of the speaker.

Through discourse analysis, the computing device 100 can analyze various aspects of the interactions (e.g., what words or phrases are used, how information is communicated, how the speaker has behaved, how the listeners have responded, etc.) to obtain information that is relevant to an expertise determination, which can be used to determine an expertise. For example, the computing device 100 can look at word classes, usage, frequency, style, behavior, etc., comparatively between speakers, to obtain information that is relevant to an expertise determination.

The speaker can also be ranked as an expert based on an expertise vector. The expertise vector can be based on several factors, such as, for example, an expertise, a prior communication effectiveness, a language, a prior communication manner, a prior communication length, an amount of prior communications related to the topic, a prior communication content, a context, a speaker's identity, a speaker's profile, a speaker's age, a speaker's experience, a tag, an interest, a degree of knowledge, a confidence in prior communications about the topic, etc. The expertise rank can be used to infer an expertise in a different topic. For example, an expertise rank in one aspect of a language can be used to infer an expertise in the language in general. Clusters of expertise ranks can be developed to create relationships between different expertise areas. The clusters of expertise ranks can then be used to make expertise inferences in different topics and/or areas.

Expertise ranks can also be used to rank answers, comments, discussions, lectures, trainings, messages, teams, blogs, and so forth. For example, an answer provided by a speaker with a high rank in the topic can be ranked higher than an answer provided by a speaker with a low rank in the topic. Moreover, expertise ranks can be used to alert experts to a question, comment, problem, and/or discussion in the expert's respective area of expertise. The expertise ranks can also be used to suggest experts to a user with a question, comment, and/or problem in a topic. Further, the expertise ranks can be provided to users as a list, for example, to view, search, and/or contact experts in a topic.

Figure 4:
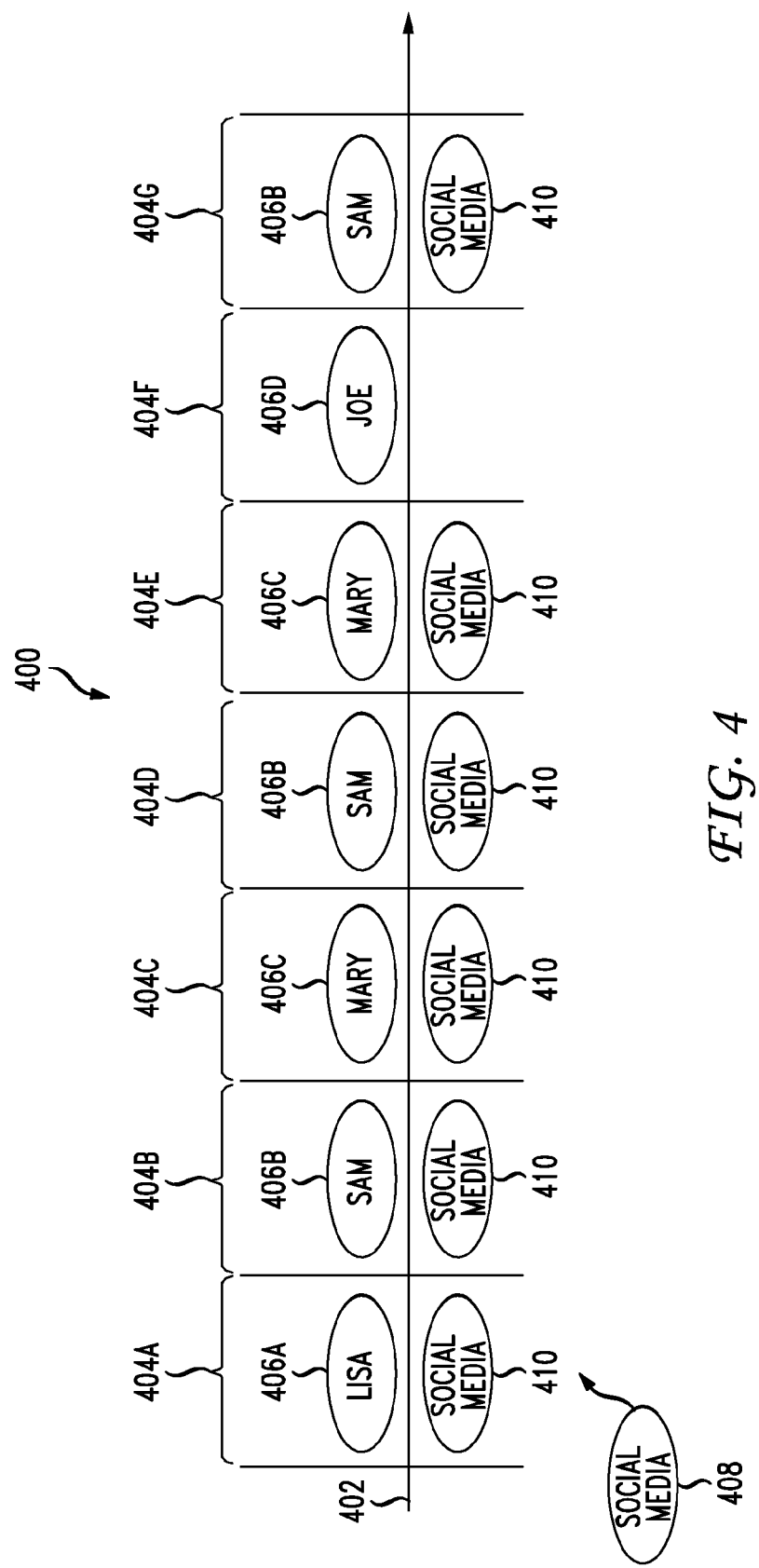
FIG. 4 illustrates an example of a tagged audio conversation.

FIG. 4 illustrates an example of a tagged audio conversation 400. The audio conversation 400 is segmented into segments 404A-G based on speakerturns throughout the length 402 of the audio conversation. The audio conversation 400 can be a single audio conversation or a compilation of a plurality of audio conversations. The segments 404A-G are then tagged with speaker tags 406A-D, which correspond to the speaker in the respective segments. For example, segment 404A is tagged with the speaker "Lisa" to indicate that Lisa spoke in segment 404A. The keyword 408 is used to tag segments where the keyword 408 is mentioned. The keyword 408 can be matched with a segment based on a probability that the keyword is mentioned in the segment. Moreover, a match can be triggered by a threshold, which can be based on a probability, a score, a confidence, a similarity, etc. In FIG. 4, the segments 404A, 404B, 404C, 404D, 404E, and 404G are tagged with the keyword tag 410, which is based on the keyword 408.

Figure 5:
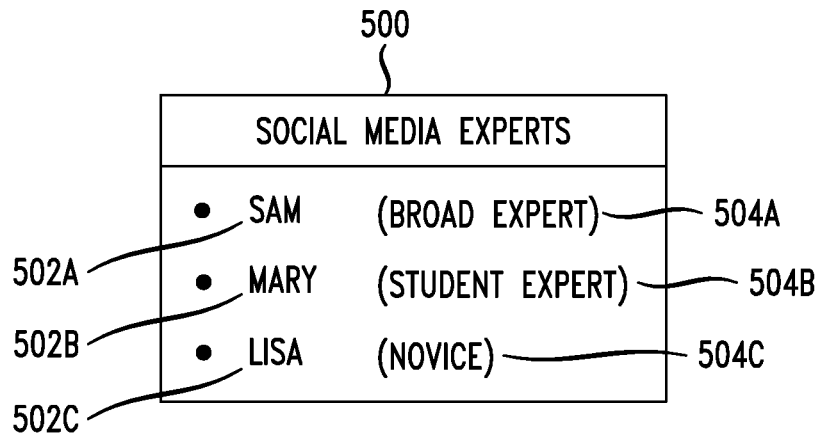
FIG. 5 illustrates an exemplary expert ranking.

FIG. 5 illustrates an exemplary expert ranking 500. The expert ranking 500 ranks experts 502A-C in the area of social media. The experts 502A-C include ranks 504A-C, which are based on the level of expertise of the experts 502A-C. The ranks 504A-C can be based on categories, such as, for example, expert, specialized expert, broad expert, experienced expert, new expert, senior expert, student expert, novice, etc. In FIG. 5, expert 502A is ranked as a broad expert, expert 502B is ranked as a student expert, and expert 502C is ranked as a novice.

The expert ranking 500 can be provided to users as a list, for example, to view, search, and/or contact experts in a topic. The expert ranking 500 can also be used to alert experts to a question, comment, problem, and/or discussion in the expert's respective area of expertise. For example, the expert ranking 500 can be used to alert Sam 502A of a general question about social media asked by a user. Similarly, the expert ranking 500 can be used to suggest experts to a user with a question, comment, and/or problem in a topic. Moreover, the expert ranking 500 can be used to rank answers, comments, discussions, lectures, trainings, messages, teams, blogs, and so forth. For example, an answer provided by Sam 502A to a social media question can be ranked higher than an answer provided by Lisa 502C to a social media question because Sam 502A has a higher ranking than Lisa 502C in the topic of social media.

Further, the expert ranking 500 can be used to develop clusters of experts in related areas. The clusters of experts can then be used to make expertise inferences in related topics and/or areas. For example, an expertiser rank in one aspect of a language can be used to infer an expertise in the language in general. As one of ordinary skill in the art will readily recognize, the expert ranking 500 can also be used for many other purposes, such as, for example, assigning tasks in a project, determining a hierarchy in a team, determining teams for specific tasks, routing calls in a call center context, assigning a review order, etc.

Figure 6:
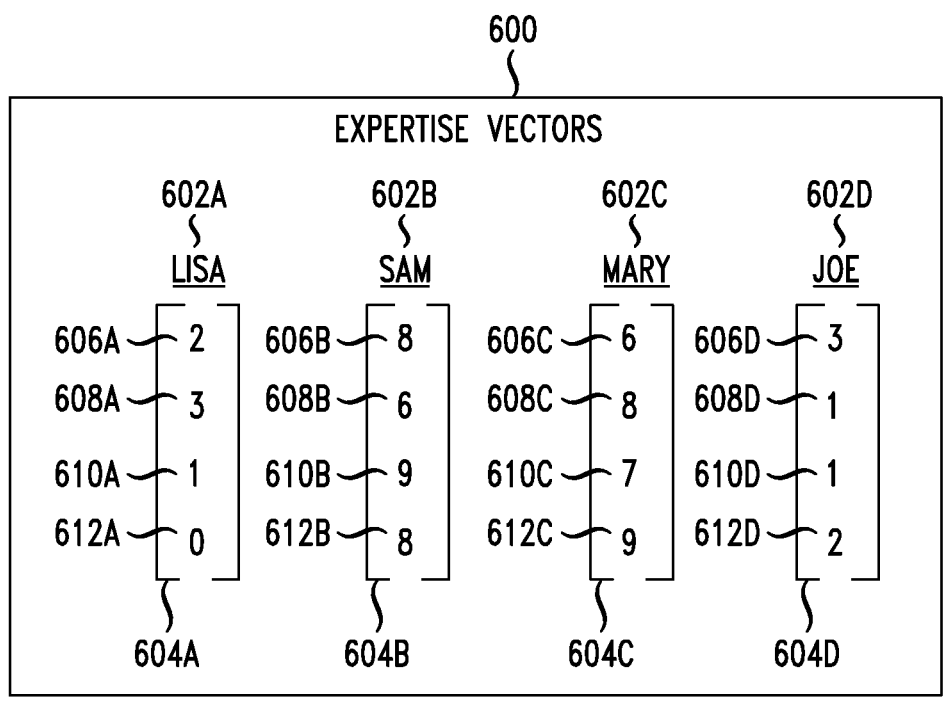
FIG. 6 illustrates example expertise vectors for determining expertise.

FIG. 6 illustrates example expertise vectors 600 for determining expertise. Experts 602A-D are ranked as experts based on the expertise vectors 604A-D. Each of the experts 602A-D has a respective expertise vector that is used for determining their respective expertise. Each of the respective expertise vectors 604A-D includes scores 606A-D, 608A-D, 610A-D, 612A-D for various factors used in determining expertise. For example, the expertise vectors 604A-D can includes scores representing an expertise range, a prior communication effectiveness, a language, a prior communication manner, a prior communication length, an amount of prior communications related to the topic, a prior communication content, a context, a speaker's identity, a speaker's profile, a tag, an interest, a degree of knowledge, experience, a confidence in prior communications about the topic, etc.

In FIG. 6, the scores 606A-D represent a number of times the experts 602A-D have spoken about the expertise topic. Here, Lisa 602A has spoken twice about the topic, Sam 602B has spoken eight times about the topic, Mary 602C has spoken six times about the topic, and Joe 602D has spoken 3 times about the topic. The scores 608A-D represent an effectiveness of prior communications. The scores 608A-D can be based on a rating provided by other users and/or experts, a response by other users and/or experts involved in the prior communications, an understanding by other users and/or experts of the information provided by the experts 602A-D in the prior communications, whether the information provided by the experts 602A-D in the prior communications is correct, etc. The scores 610A-D represent a topic confidence expressed by the experts 602A-D in prior communications. For example, the scores 610A-D can be based on the expert's 602A-D assertiveness when speaking about the topic in the prior communications. The scores 610A-D can also be based on whether the experts 602A-D have described themselves as experts, beginners, experienced, knowledgeable, specialized, etc., in the topic. The scores 612A-D represent the length of prior communications about the topic. For example, the experts 602A-D can receive a higher score for talking longer about the topic, indicating that they may have a higher level of interest and/or knowledge in the topic.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
    associating speakers with respective segments of an audio speech file to yield associated speaker segments;
    generating, via a processor using automatic speech recognition of audio in the audio speech file, expertise vectors for one or more of the speakers, the expertise vectors comprising scores based on:
    (i) number of times the speakers have spoken about a topic in the audio speech file by searching the associated speaker segments for a term associated with the topic, and (ii) at least one of word classes, usages, styles, or behaviors of the speakers; and ranking the speakers as experts based on the expertise vectors;

presenting, by the processor, the ranking of the speakers as experts based on the expertise vectors;

tagging the associated speaker segments having the term with keyword tags; and matching a respective segment from the associated speaker segments with a speaker, the respective segment having a keyword tag.

2. The method of claim 1, further comprising identifying the number of times the speakers have spoken about the topic in the audio speech file by searching the associated speaker segments for a set of terms associated with the topic, wherein terms in the set of terms are scored according to a probability that the terms indicate an expertise in the topic, and wherein a combined score associated with the set of terms indicates the expertise in the topic when a scoring threshold is reached.

3. The method of claim 2, wherein the set of terms indicates expertise in at least one of a plurality of topics when the combined score reaches a respective scoring threshold associated with the plurality of topics.

4. The method of claim 3, wherein the set of terms indicate the expertise on the topic when a combination of a first set of terms from the set of terms and a second set of terms from the set of terms indicates the expertise on the topic.

5. The method of claim 1, further comprising:
performing a discourse analysis of the audio speech file, wherein the discourse analysis comprises searching for a set of terms in the audio speech file that indicates a behavior having a relevance to an expertise determination associated with the topic; and ranking the speaker as the expert in the topic based on the discourse analysis.

6. The method of claim 1, wherein the number of times the speakers have spoken about the topic in the audio speech file are within a predetermined time period.

7. The method of claim 1, further comprising identifying the number of times the speakers have spoken about the topic in the audio speech file based on a probability that a respective segment from the associated speaker segments contains the term.

8. The method of claim 1, wherein the audio speech file comprises an audio conversation between the speakers.

9. The method of claim 1, further comprising tagging a segment from the associated speaker segments with a keyword tag based on a probability that the segment from the associated speaker segments contains the term.

10. The method of claim 1, wherein the ranking of the speakers is further based on one of a content of a respective segment that contains the term, an age of the respective segment that contains the term, an age of the speaker, an experience of the speaker, or an effectiveness of prior communications by the speaker.

11. The method of claim 1, wherein the ranking of the speakers is further based on a manner in which the speaker has spoken about the topic in the audio speech file.

12. The method of claim 1, further comprising alerting at least one of the speakers when a user asks a question on the topic.

13. The method of claim 1, further comprising ranking an answer from a speaker to a question on the topic based on an expertise rank of the speaker.

14. The method of claim 1, wherein the expertise vectors comprise scores representing one of an expertise range, a prior communication effectiveness, a language, a prior communication manner, a prior communication length, an amount of prior communications related to the topic, a prior communication content, a context, a speaker's identity, a speaker's profile, a tag, an interest, a degree of knowledge, experience, confidence in prior communications about the topic.

15. The method of claim 1, further comprising inferring an expertise in a different topic based on an expert rank in the topic.

16. A system comprising:
a processor; and
a computer-readable storage medium storing instructions which, when executed by the processor, cause the processor to perform operations comprising:
associating speakers with respective segments of an audio speech file to yield associated speaker segments;

generating, via automatic speech recognition of audio in the audio speech file, expertise vectors for one or more of the speakers, the expertise vectors comprising scores based on:

(i) number of times the speakers have spoken about a topic in the audio speech file by searching the associated speaker segments for a term associated with the topic, and (ii) one of word classes, usages, styles, and behaviors of the speakers; and ranking the speakers as experts based on the expertise vectors:

presenting, by the processor, the ranking of the speakers as experts based on the expertise vectors;

tagging the associated speaker segments having the term with keyword tags; and matching a respective segment from the associated speaker segments with a speaker, the respective segment having a keyword tag.

17. The system of claim 16, wherein the audio speech file comprises an audio conversation.

18. A system comprising:
means for associating, with a processor, speakers with respective segments of an audio speech file to yield associated speaker segments;

means for generating, via the processor executing an automatic speech recognition module, expertise vectors for one or more of the speakers, the expertise vectors comprising scores based on:

(i) number of times the speakers have spoken about a topic in the audio speech file by searching the associated speaker segments for a term associated with the topic, and (ii) at least one of word classes, usages, styles, or behaviors of the speakers; and ranking the speakers as experts based on the expertise vectors;

means to present, by the processor, the ranking of the speakers as experts based on the expertise vectors;

means for tagging, by the processor, the associated speaker segments having the term with keyword tags; and means for matching, by the processor, a respective segment from the associated speaker segments with a speaker, the respective segment having a keyword tag.

* * * * *